June 8, 1926.
A. F. PURNER
1,588,333
PAINT MIXING MACHINE
Filed Jan. 16, 1924 2 Sheets-Sheet 1
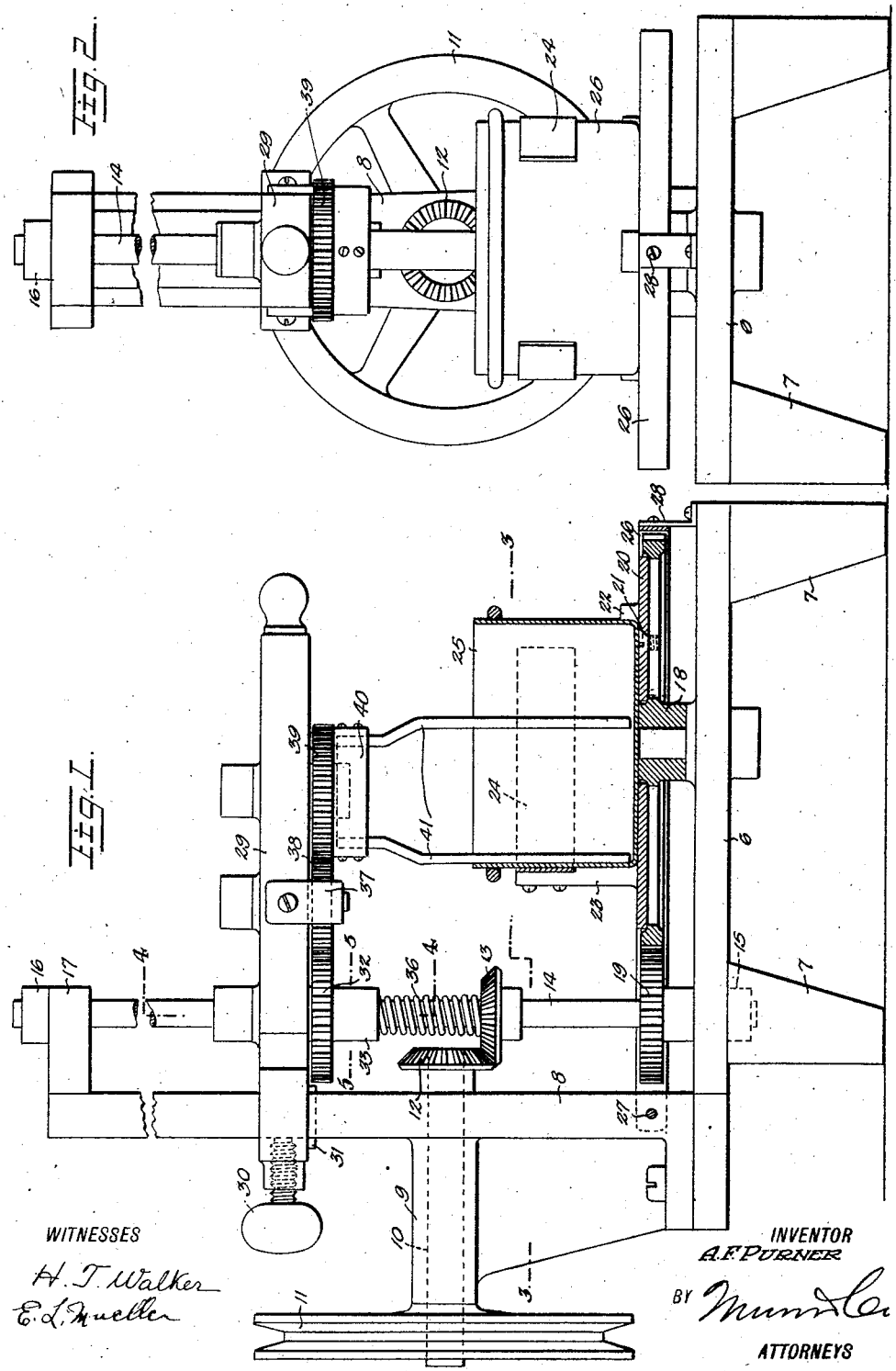
WITNESSES
INVENTOR
A. F. PURNER
ATTORNEYS June 8, 1926.

A. F. PURNER 1,588,333

PAINT MIXING MACHINE

Filed Jan. 16, 1924

WITNESSES

INVENTOR
A. F. PURNER
BY
ATTORNEYS

Patented June 8, 1926.

1,588,333

UNITED STATES PATENT OFFICE.

ANTHONY F. PURNER, OF CARLSTADT, NEW JERSEY.

PAINT-MIXING MACHINE.

Application filed January 16, 1924. Serial No. 686,695.

This invention relates to improvements in mixing machines, and has particular reference to a machine for viscous materials, such as paints and the like.

An object of the invention is to provide an improved machine in which the receptacle and the mixing element cooperating therewith are rotated in opposite directions and in which the receptacle is securely maintained against accidental displacement when the machine is in operation.

Another object is to provide a machine of simple and inexpensive construction and positive in its operation.

The above and other objects will appear more clearly from the following detailed description when taken in connection with the accompanying drawings, which illustrate a preferred embodiment of the inventive idea.

In the drawings—

Figure 1 is a fragmentary side elevation, partly in section, of the machine constructed in accordance with the invention;

Figure 2 is a front elevation thereof;

Figure 3:
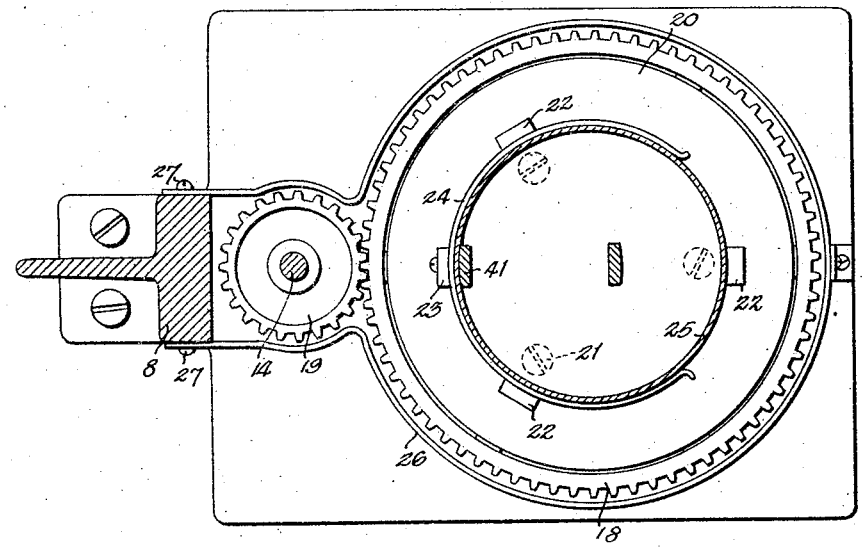
Figure 3 is a horizontal section on the line 3—3 of Figure 1.
Figure 4:
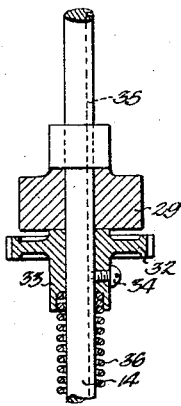
Figure 4 is a section on the line 4—4 of Figure 1.
Figure 5:
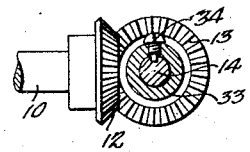
Figure 5 is a section on the line 5—5 of Figure 1.

In its preferred from the invention is shown as comprising a base 6 supported upon the legs 7 and having arranged at one end thereof a standard 8 formed with a bearing 9 intermediate the ends thereof. In this bearing there is mounted a drive shaft 10 driven from any suitable source of power through the medium of the pulley 11 and operated to rotate a bevel gear 12 meshing with a similar gear 13 secured to the vertical shaft 14. This shaft extends longitudinally of the standard 8 and is mounted in suitable bearings 15 and 16 formed, respectively, in the base 6 and the extension 17 at the upper end of the standard 8.

Mounted for rotation in a direction opposite to that of the shaft 14 is a large gear 18 which is driven by a smaller gear 19 meshing therewith and fixed to said shaft 14. The upper face of the gear 18 is preferably recessed to receive a supporting plate 20 secured to said gear in any suitable manner, as by the screws 21. Arranged upon the plate 20 concentrically with the axis of rotation of the gear 18 are series of retaining lugs 22 preferably spaced 120° apart and disposed between two of the adjacent lugs is an upright 23. To the upper end of the upright is secured the intermediate portion of a resilient clamping member 24 of arcuate formation and capable of partially surrounding a receptacle 25 for containing the material to be mixed. The bottom portion of the receptacle 25 is also engaged with the lugs 22 so that when the receptacle is in position upon the supporting plate 20, it will be apparent that the same will be securely maintained in such position when being rotated. In order to protect the operator against possible injury when the machine is in operation a guard 26 is provided for the gears 18 and 19, which guard is formed of an elongated strip of material of a width greater than that of the gears, the ends of the guard being scured at 27 to the standard 8 and the remaining portions being secured at 27 to the standard 8 and to the base 6 at 28, the guard being bent to conform substantially to the contour of said gears.

A supporting arm 29 is mounted for vertical movement upon the upper portions of the standard 8 and shaft 14 and carries a set screw 30 which is engageable with the standard 8 to secure the arm 29 in various adjusted positions. The downward movement of the arm 29 is limited by a pin 31 carried by the standard 8 for a purpose which will presently appear. A gear 32 having a hub portion 33 is slidably mounted upon the shaft 14 below the arm 29 and said hub portion carries a set screw 34 engageable in a slot 35 formed in said shaft so that the gear will be positively driven by that rotation of the shaft. The lower end of the hub portion 33 is recessed to receive one end of a coil spring 36, the other end of which is engageable with the gear 13 on the shaft 14 so as to exert a constant upward pressure on the gear 32 to maintain the same in proper relation to the arm 29 regardless of the position of said arm. This spring also aids in elevating the arm 29 when the set screw 30 is released from binding engagement with the standard 8 following a mixing operation. Intermediate the ends of the arm 29 the same has attached thereto a hanger 37 in which is supported an idle gear 38 which meshes with the gear 32 and also with a gear 39 supported for rotation by the arm 29. It will be obvious that through the intermediary of the gears 32 and 38 the gear 39 will be driven in the same direction as the shaft 14. It will also be seen from Figure 1 that the gear 39 is so positioned that its axis of rotation is out of alignment with that of the gear 18.

The gear 39 supports in any suitable manner a mixing element 40 including oppositely disposed blades 41 which are designed to be extended into the receptacle 25 until the lower ends thereof are in close proximity to the bottom of the receptacle, the downward movement of the blades 41 being limited by the pin 31 carried by the standard 8 when the arm 29 is adjusted downwardly on said standard and the shaft 14 against the tension of the spring 36. By arranging the axis of rotation of the gear 39 out of alignment with that of the gear 18 and consequently of the receptacle 25 the blades 41 are caused to alternately engage the sides of the receptacle when the machine is in operation. In rotating the blades 41 in an opposite direction from that of the receptacle 25 it will be obvious that the material in the receptacle will be thoroughly mixed by the action of the blades and be prevented from adhering to the sides of the receptacle by reason of the contact of the blades with said sides.

What is claimed is:

1. In a mixing machine, a rotatable receptacle supporting member, a second supporting member mounted above the first-named member for adjustment toward and away therefrom, a mixing element carried by said second supporting member and adjustable therewith and into and out of a receptacle on said first-named supporting member, and driving means for rotating said first-named supporting member and said mixing element regardless of their relative adjustment.

2. In a mixing machine, a rotatable receptacle supporting member, a second supporting member mounted above the first-named member for adjustment toward and away therefrom, a mixing element carried by said second supporting member and adjustable therewith and into and out of a receptacle on said first-named supporting member, and driving means for rotating said first-named supporting member and mixing element in opposite directions and in any one of the adjusted positions of said mixing element relative to the receptacle on the said first-named supporting member and while the second supporting member is being adjusted with respect to the first-named supporting member.

3. In a mixing machine, a base, a standard carried thereby, a driven shaft supported by said base and standard, a rotatable member driven by said shaft in an opposite direction therefrom, a receptacle supporting plate carried by said supporting member, a supporting arm adjustable longitudinally of said standard and driven shaft, a gear carried by said arm, other gearing operated by said driven shaft to rotate the last-mentioned gear in the same direction of said shaft irrespective of the adjusted position of said supporting arm relative to said standard and shaft, and a mixing element supported by said last-mentioned gear and movable into and out of cooperative relation with a receptacle on said supporting plate when said arm is adjusted longitudinally of said standard.

4. In a mixing machine, a base, a standard carried thereby, a driven shaft supported by said base and standard, a rotatable member driven by said shaft in an opposite direction therefrom, a receptacle supporting plate carried by said supporting member, a supporting arm adjustable longitudinally of said standard and driven shaft, a gear carried by said arm, other gearing operated by said driven shaft to rotate the last-mentioned gear in the same direction of said shaft irrespective of the adjusted position of said supporting arm relative to said standard and shaft, a mixing element supported by said last-mentioned gear and movable into and out of cooperative relation with a receptacle on said supporting plate when said arm is adjusted longitudinally of said standard, and means carried by the standard for limiting the movement of said arm and mixing element in one direction.

5. In a mixing machine, a base, a standard carried thereby, a driven shaft supported by said base and standard, a rotatable member driven by said shaft in an opposite direction therefrom, a receptacle supporting plate carried by said supporting member, a supporting arm adjustable longitudinally of said standard and driven shaft, a gear carried by said arm, other gearing operated by said driven shaft to rotate the last-mentioned gear in the same direction of said shaft irrespective of the adjusted position of said supporting arm relative to said standard and shaft, a mixing element supported by said last-mentioned gear and movable into and out of cooperative relation with a receptacle on said supporting plate when said arm is adjusted longitudinally of said standard, and resilient means supported on said shaft and engageable with one of the gears of said other gearing for exerting an upward pressure upon said gear and said arm.

ANTHONY F. PURNER.